US 12,178,163 B2

(12) United States Patent
Casadei et al.

(10) Patent No.: US 12,178,163 B2
(45) Date of Patent: Dec. 31, 2024

(54) BALER WITH RAMP SENSOR

(71) Applicant: KVERNELAND GROUP RAVENNA S.R.L., Russi (IT)

(72) Inventors: Valerio Casadei, Cesena (IT); Cosimo Frascella, Lugo (IT)

(73) Assignee: KVERNELAND GROUP RAVENNA S.R.L., Russi (IT)

(*) Notice: Subject to any disclaimer, the term of this patent is extended or adjusted under 35 U.S.C. 154(b) by 238 days.

(21) Appl. No.: 17/611,883

(22) PCT Filed: Jan. 20, 2021

(86) PCT No.: PCT/IB2021/050408
§ 371 (c)(1),
(2) Date: Nov. 16, 2021

(87) PCT Pub. No.: WO2021/148953
PCT Pub. Date: Jul. 29, 2021

(65) Prior Publication Data
US 2022/0338418 A1 Oct. 27, 2022

(30) Foreign Application Priority Data
Jan. 20, 2020 (IT) .................. 102020000001009

(51) Int. Cl.
*A01F 15/08* (2006.01)
*A01F 15/07* (2006.01)

(52) U.S. Cl.
CPC ...... *A01F 15/0883* (2013.01); *A01F 15/0715* (2013.01); *A01F 2015/0808* (2013.01); *A01F 2015/0891* (2013.01)

(58) Field of Classification Search
CPC .............. A01F 15/0883; A01F 15/0715; A01F 15/0833; A01F 15/08; A01F 15/07; A01F 2015/0808; A01F 2015/0891
See application file for complete search history.

(56) References Cited

U.S. PATENT DOCUMENTS 4,624,179 A 11/1986 Yves et al.
6,185,990 B1 2/2001 Missotten et al.
(Continued)

FOREIGN PATENT DOCUMENTS

EP 1 444 882 A2 8/2004
EP 2 777 384 B1 11/2016
(Continued)

OTHER PUBLICATIONS

PCT International Search Report and Written Opinion from PCT International Application No. PCT/IB2021/050408, International Filing Date Jan. 20, 2021 (11 pgs).

*Primary Examiner* — Thomas B Will
*Assistant Examiner* — Robert E Pezzuto
(74) *Attorney, Agent, or Firm* — Wentsler LLC

(57) ABSTRACT

A baler comprises: a frame, including a forming chamber, configured to receive crops and to form a bale; a feeding assembly, configured to collect the crops from the ground and to feed the crops into the forming chamber; a tailgate, movable between a closed position, wherein the forming chamber is closed, and an open position, wherein the forming chamber is open to an external environment for discharging the bale; a control unit; a ramp, configured to lay down the bale on the ground and movable between a raised position and a discharge position, for allowing a release of the bale; a ramp sensor, responsive to a change of position of the ramp from the raised position to the discharge position and vice versa. The control unit is connected to the ramp sensor for assessing a release of the bale, responsive to a change of the ramp position from the raised position to the discharge position and, in succession, from the discharge position to the raised position. The control unit comprises a timer.

20 Claims, 6 Drawing Sheets

(56) References Cited

U.S. PATENT DOCUMENTS

| | | | |
|---|---|---|---|
| 6,378,276 B1* | 4/2002 | Dorge | G01G 19/08 |
| | | | 177/136 |
| 7,064,282 B2 | 6/2006 | Viaud et al. | |
| 7,340,996 B1 | 3/2008 | Viaud | |
| 7,703,391 B2* | 4/2010 | Duenwald | A01F 15/0833 |
| | | | 100/88 |
| 8,326,563 B2 | 12/2012 | Kraus | |
| 2012/0189417 A1* | 7/2012 | Blough | A01F 15/0883 |
| | | | 701/49 |

FOREIGN PATENT DOCUMENTS

| | | |
|---|---|---|
| EP | 2 777 394 B1 | 11/2016 |
| EP | 2 923 560 B1 | 6/2017 |
| EP | 2 745 675 B1 | 2/2019 |
| WO | 2012092164 A1 | 7/2012 |

* cited by examiner

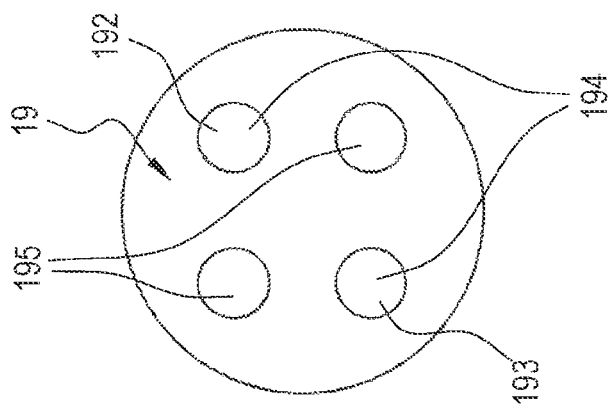
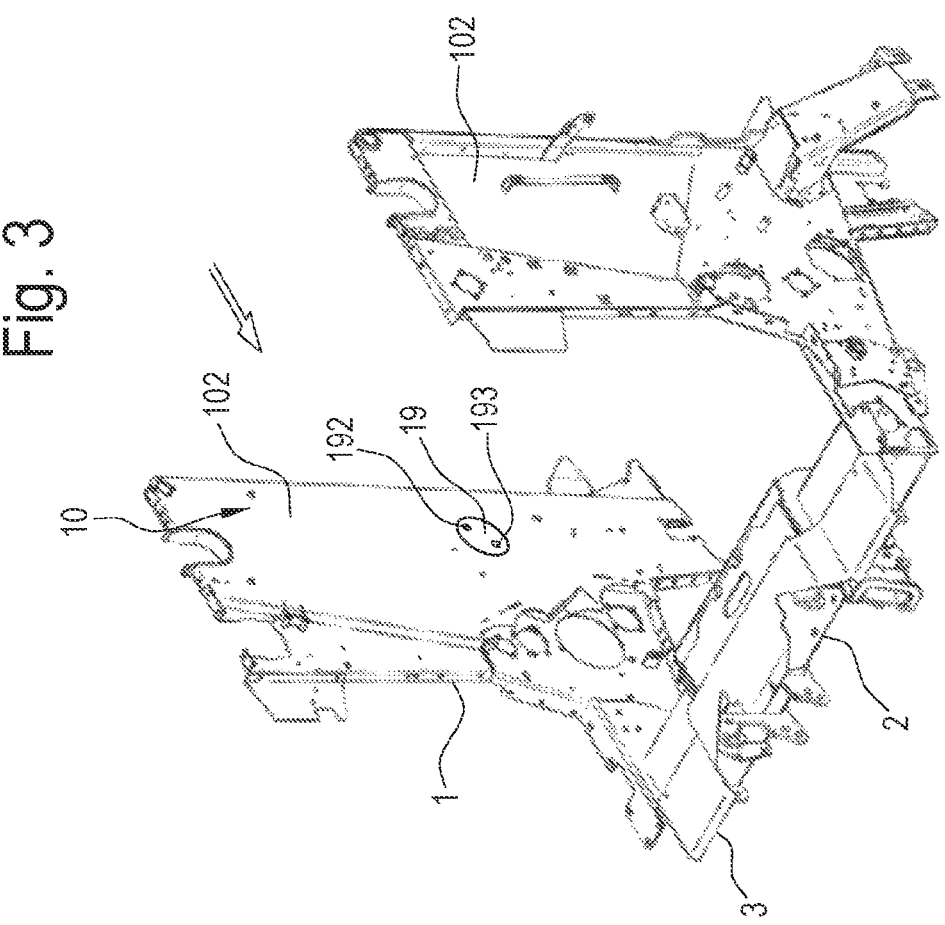

BALER WITH RAMP SENSOR

TECHNICAL FIELD

This invention relates to a baler and to a method for providing a bale.

In particular, the invention relates to a baler with a ramp sensor.

BACKGROUND ART

This disclosure relates to agricultural machines such as round balers, square balers, forage wagons or trailers.

In this field, during the bailing operation, is important to know the weight of the bale, in order to create bales having a similar weight, possibly included into a certain range. Moreover, the weight of the bale may be function of other environment parameters.

Followings these needs, it is known to provide a baler with a weighting system, configured to detect the weight of the baler (or the weight of the forming chamber). However, during the operations, the weight detection may be affected by different inclination of the field. Hence, some solutions have been modified to take into account this problem.

For example, document EP2745675B1 describes a solution wherein the baler is provided with an inclinometer. According to this solution, for each bale, a control unit of the baler receives a first weight value, being the weight of the baler before ejecting the bale, and a second weight value, being the weight of the baler after ejecting the bale. Moreover, the inclinometer sends to the control unit the inclination angle of the baler with respect to a horizontal plane.

The control unit calculates first the difference between the first weight value and the second weight value and then proceeds with correcting this difference based on the inclination angle.

However, according to this solution, in order to have the bale weight, the operator has to eject the bale first. Hence, even if you know the weight of the bale, you cannot change it anymore.

Other documents, such as U.S. Pat. No. 7,064,282B2, U.S. Pat. No. 8,326,563B2 and U.S. Pat. No. 7,703,391 B2 disclose a method to detect the bale weight.

Moreover, during the baling operations, it is important to kwon when the bale is correctly ejected from the forming chamber in order to control the closure of the tail gate. To solve this problem, document EP2923560B1 discloses the presence of a sensor on the ramp, configured to detect the bale in a clear position, i.e. a position in which the closure of the tail gate will not be hindered by the ejecting bale. However, this solution can be affected by false measurement, resulting in the fact that the tail gate may be kept open even when the bale is already laid down. Also, WO2012092164A1, EP2923560B1 and EP2777384B1 disclose solutions regarding a sensorized ramp.

In addition to that, another important parameter to keep under control is the density of the bale. In this regard, a significant role is played by the humidity of the bale. In fact, if the humidity is very high, it is preferable to keep low the density of the core of the bale, in order to avoid biological degradation of the bale, such as the creation of mildew (mold).

Documents U.S. Pat. No. 7,340,996B1 and U.S. Pat. No. 6,185,990B1 described baler in which is implemented a humidity sensor. However, they are not so easy to mount and has a difficult maintenance. Moreover, after the formation of the bale, the bale itself is wrapped through a film, that avoid the bale disaggregation. Sometimes, the film it is not properly applied on the bale and this can result in disaggregation of the bale after its ejection.

Moreover, another pertinent document which present different disadvantages is US2012189417A1.

DISCLOSURE OF THE INVENTION

Scope of the present invention is to overcome the aforementioned drawbacks.

This scope is achieved by the baler and the method for detect the weight of a bale that overcomes at least one of the aforementioned drawbacks.

This scope is achieved the baler and the method for detect the weight of a bale according to the appended claims.

The baler comprises a frame (a structure). The frame includes a forming chamber. The forming chamber is configured to receive crops. The forming chamber is configured to form a bale. The forming chamber (the frame or the baler) includes pressing elements, configured to press the crops into the forming chamber to form the bale. The pressing elements may be rollers or belt.

The baler includes a feeding assembly. The feeding assembly is configured to collect the crops form the ground. The feeding assembly is configured to feed the crops into the forming chamber.

The baler includes a tailgate. The tailgate is movable between a closed position, wherein the forming chamber is closed, and an open position, wherein the forming chamber is open to an external environment for discharging the bale.

The baler includes a ramp. The ramp is configured to lay down the bale on the ground. The ramp is movable between a receiving position, wherein it receives the bale from the forming chamber, and a releasing position, wherein it leaves the bale on the ground.

The ramp is mobile between a raised position and a discharge position, for allowing a release of the bale.

The baler includes a weighing system. The weighing system is configured to detect weight data representative of a weight of the forming chamber. Please observe that the weighting system could be configured also to detect weight of the entire baler. In fact, also in this solution, the weighing system detect the weight of the forming chamber.

The baler includes an inclinometer. The inclinometer is configured to detect inclination data, representative of an inclination angle of the baler with respect to a horizontal plane (that is perpendicular to the direction of the weight force). The inclination with respect to the horizontal plane includes a first inclination value, corresponding to an angle of inclination with respect to a direction defined by the front and the rear side of the baler. The inclination with respect to the horizontal plane includes a second inclination value, corresponding to an angle of inclination with respect to a direction defined by the two lateral sides of the baler.

The baler includes a control unit. The control unit is connected to the weighing system. The control unit is connected to the inclinometer. In this way the control unit receives the weight data and/or the inclination data. The control unit is configured to calculate a corrected bale weight, responsive to the weight data and/or to the inclination data. Please observe that the control unit can be detached from the baler and not necessarily mounted on it. In fact, in some embodiments, the control unit can be placed on a tractor, configured to tow the baler on the field.

According to an embodiment, the control unit (the baler) is configured to store reference tare data in a memory. The reference tare data are representative of a weight of the empty forming chamber, i.e. the forming chamber without any crops in it.

The control unit is programmed to calculate the corrected bale weight in real time, preferably as a function of the stored reference tare data and/or of the weight data and/or of the inclination data.

The control unit is configured to receive the weight data and the inclination data in real time.

According to this embodiment, the operator or the control unit know the weight of the bale before its ejection and can vary the bale weight accordingly.

In one embodiment, the control unit is configured to store a reference inclination angle in the memory. The reference inclination angle is representative of the inclination angle of the baler during detection of the reference tare data.

The control unit is configured to correct the weight data as a function of the inclination data and/or the reference inclination angle. For example, in one embodiment, the weight data is corrected as a function of the difference between the inclination angle (represented by the inclination data) and/or the reference inclination angle.

The control unit is configured to calculate the corrected bale weight as a difference, preferably in real time, between the corrected weight data and the reference tare data.

In one embodiment, the baler comprises a user interface. The user interface includes a display. The display is configured to show an indication, preferably in real time, of the corrected bale weight. As clarified for the control unit, the display can be detached from the baler and not necessarily mounted on it. In fact, in some embodiments, the display can be placed on the tractor.

In one embodiment, the control unit is configured to store in the memory a threshold weight value. The threshold weight value is inserted manually and/or is automatically derived from other parameters, for example humidity of the field.

The setting of the threshold weight value helps the operator to have a direct feedback on the weight limit to take into account, avoiding to create overweight bales and over pressed bales.

In one embodiment, the control unit is configured to command in real time an ejection of the bale, preferably responsive to a comparison between the bale weight and the threshold weight value. In other words, when the weight of the bale reaches a certain value (threshold weight value), the control unit command the opening of the tail gate in order to eject the bale.

These embodiments further reduce the risk of forming bales not complying with the standard.

The control unit includes a printed circuit board. In one embodiment, the inclinometer is integrated into the printed circuit board.

In one embodiment, the control unit is configured to upgrade the reference tare data and/or the reference inclination angle after a predetermined interval of time from the last operation of storing the reference tare data and/or the reference inclination angle.

This increases the precision of the bale weight measurement.

In one embodiment, the baler comprises a humidity sensor. The humidity sensor is configured to detect humidity data, representative of a humidity of the bale.

The humidity sensor is configured to detect the humidity data in real time. The humidity sensor is connected to the control unit to send the humidity data to the control unit. The control unit is configured to command the tail gate and/or the pressing elements responsive to the humidity data.

In one embodiment, the control unit is configured to command the pressing elements responsive to the humidity data, to control a density of the bale.

The frame comprises a couple of side wall, delimiting the forming chamber.

In one embodiment, the humidity sensor is placed on one side wall of said couple of side wall.

According to another aspect of the present disclosure, the baler comprises a ramp sensor. The ramp sensor is configured to detect the presence of the bale on the ramp. In particular, the ramp sensor is configured to detect the relative position of the ramp with respect to the frame.

The ramp sensor is responsive to a change of position of the ramp from the raised position to the discharge position and vice versa. In one embodiment, the control unit is connected to the ramp sensor for assessing a release of the bale, responsive to a change of the ramp position from the raised position to the discharge position and, in succession, from the discharge position to the raised position.

The baler comprises an axle. The axle is connected to the frame. The axle is also connected to a pair of wheels of the baler.

In one embodiment, the ramp sensor includes a static element. The static element is fixed to the axle. The ramp sensor includes a moving element. The moving element is fixed to the ramp. The sensor is movable between a loaded position, wherein the static element and the moving element are in a first relative position, and an unloaded position, wherein the static element and the moving element are in a second relative position.

More in particular, in the first relative position, the static element and the moving element are aligned along a sensing direction whereby, in the second relative position, the static element and the moving element are misaligned along the sensing direction. In one embodiment, the control unit is configured to receive a ramp signal from the ramp sensor. The ramp signal is representative of a relative position between the static element and the moving element.

The control unit is configured to derives a complete ejection of the bale responsive to a shape of the ramp signal over time. In particular, the control unit is configured to recognize the bale ejection when it receives a ramp signal representative of the following sequence: second relative position, first relative position and again second relative position.

This means that the bale has passed and it has been already released on the ground.

In one embodiment, in order to avoid false measurement of the ramp sensor, the baler includes a further positioning sensor, configured to detect data representative of a ramp position. In particular, the positioning sensor is configured to detect when the ramp reaches the discharge position.

In this way, a slightly variation of the relative position between the static element and the moving element (that can be caused even by irregular ground) will not be read by the control unit as a passage of the bale on the ramp.

In one embodiment, baler (or the control unit) comprises a timer. The control unit is connected to the timer to detect a time interval, starting from an instant (in response to a trigger event).

The control unit is programmed to start to detect (count) the time interval in response to a ramp signal (the ramp signal is used as the trigger event). In one embodiment, the control unit is programmed to start the detection of the time interval in response to a predetermined sequence of values of the ramp signal over time. For example, the control unit is programmed to start the detection of the time interval when a release of the bale is assessed according to the present disclosure, i.e. when the ramp signal is representative of changes of the ramp position from raised position to discharge position and then back to raised position.

The control unit is configured to command a closure of the tail gate depending of the time interval and of the ramp signal. Hence, in one embodiment, the control unit is configured to command the closure of the tailgate when a predetermined safety time interval has lapsed, after the release of the bale is assessed; in another example, the control unit is configured to inhibit the closure of the tailgate until a time limit smaller than the predetermined safety time interval has lapsed, after the release of the bale is assessed.

In other words, the timer counts the time passed from the release of the bale and passes this time interval to the control unit which compares this time interval with a safety time interval before starting the closure of the tailgate.

This feature further increases the safety of the system in order to avoid the tail gate to urge the bale in his closing path.

According to another aspect, the timer is used by the control unit to detect the time interval between the instant at which the ramp sensor changes status from the raised position (thus indicating that the ramp has moved down with respect to the raised position, by a given angle of inclination) and the instant at which the ramp sensor gets back to the status of raised position; in this way, a time interval is detected. The control unit receives (reads) this time interval and is programmed to compare the time interval with a minimum (predetermined) time interval. The control unit is configured to assess the release of the bale further in response to a comparison between the time interval and the minimum time interval. Preferably, the control unit is programmed to use the fact the time interval is greater than the minimum time interval as a further condition that must be verify in order to provide the assessment that the bale has been released. This solution is used to avoid an incorrect assessment of bale release, in response to (small) oscillations of the bale ramp (which could be caused for example by irregular or inclined ground, on which the baler lays.

In one embodiment, the baler comprises a camera, positioned at the top of the frame. The camera provides an image representation of a portion of the external surface of the bale, to the user at the user interface. Such image information provided by the camera may be used (e.g. through a software including image processing routines) for detecting the presence of a plastic film (or a net or any other binding system) applied on the external surface of the bale.

According to a further aspect of the present disclosure, the baler comprises a film detection sensor. The film detection sensor is configured to detect a presence of a film surrounding the bale. The film detection sensor is configured to acquire film detection data, representative of the presence of a plastic film surrounding the bale.

In one embodiment, the film detection sensor is a camera. The camera is connected to the control unit to send image data, representative of an image taken by the camera.

In one preferred embodiment, the camera is positioned at the top of the frame. More in particular, in one embodiment, the camera is positioned at the top of a side wall of said pair of side walls of the frame.

In one embodiment, the baler comprises another film detection sensor, forming a plurality of film detection sensor, for example an additional camera. In this embodiment, both the camera and the additional camera are positioned at the top of the frame, preferably each one at the top of a corresponding side wall of said couple of side walls.

The camera is configured to send to the control unit image data, representative of a portion of the external surface of the bale. The control unit is configured to send the image data to the user interface, in order to show the image acquired by the camera on a display. Hence, the operator may check if the film is correctly applied to the bale.

In other embodiment, the control unit includes a image processor module, configured to run image processing routines. The image processor module is configured to receive the image data, elaborate the image data and generate and indication of the presence of the plastic film on the bale.

In one embodiment, the film detection sensor includes a transducer. The transducer is sensible to a physical quantity that varies responsive to the presence of the plastic film around the bale.

The transducer is configured to send to the control unit a film signal, responsive to a variation of the physical quantity. The control unit is configured to show on the user interface an indication of the presence of the film sensor, responsive to the film signal.

In one embodiment, the physical quantity could be a colour, a value of capacity or inductivity, a reflection value.

According to another aspect of the present description, the present disclosure aims to protect also an agricultural system.

The agricultural system comprises a tractor, having a motor to advance on a field. The agricultural system comprises a baler according to any of the features described in the present disclosure. The baler is towed by the tractor on the field.

Please observe that the tractor includes a processing unit and/or a user interface. The processing unit may be in addition to the control unit of the baler or may be the control unit of the baler described before, when it is positioned on the tractor. In a preferred example, the processing unit is in addition to the control unit. The processing unit is configured to receive from the control unit the inclination data and the weight data in order to calculate the corrected bale weight. Therefore, the processing unit of the tractor may works exactly as described for the control unit of the baler. The same considerations hold for the display of the tractor that can be in addition to that of the baler or can be the one described before with reference to the baler (when it is detached from the baler itself).

The present disclosure provides also a method for detecting a bale weight in a baler comprising a frame, including a forming chamber, a feeding assembly, a tail gate and a ramp.

The method comprises a step of feeding crops into the forming chamber through the feeding assembly.

The method comprises a step of moving the tail gate between a closed position, wherein the forming chamber is closed, and an open position, wherein the forming chamber is open to an external environment for discharging the bale. The method comprises a step of laying down the bale through the ramp. The method comprises a step of detecting weight data representative of a weight of the forming chamber, through a weighing system. The method comprises a step of detecting inclination data, representative of an inclination angle of the baler with respect to a horizontal plane, through an inclinometer. The method comprises a step of receiving the the weight data and/or the inclination data into a control unit of the baler.

The method comprises a step of calculating a corrected bale weight, responsive to the weight data and/or to the inclination data, through the control unit.

In one embodiment, the method further comprises a step of storing reference tare data in a memory. Preferably, the reference tare data are representative of a weight of the empty forming chamber.

In the step of receiving, the control unit receives the weight data and/or the inclination data in real time. In the step of calculating, the control unit calculates the corrected bale weight in real time, preferably as a function of the stored reference tare data and/or of the weight data and/or of the inclination data.

The method comprises a step of storing a reference inclination angle in the memory, preferably representative of the inclination angle (with respect to the horizontal plane) of the baler during detection of the reference tare data.

The step of calculating comprises a step of correcting the weight data as a function of the inclination data and/or the reference inclination angle.

In the step of calculating the corrected bale weight is obtained as a difference, preferably in real time, between the corrected weight data and the reference tare data.

The method comprises a step of showing, wherein the corrected bale weight is shown on a display, preferably in real time.

The method comprises a step of storing in the memory a threshold weight value, preferably by the control unit. The method comprises a step of setting the threshold weight value. In one embodiment, the setting step can be a manual operation. In one embodiment, the setting step can be an automatically process, for example the control unit derived the threshold weight value as a function of other parameters, such as the humidity of the field.

In one embodiment, the method comprises a step of automatic control. In the step of the automatic control, the control unit command in real time an ejection of the bale, responsive to a comparison between the bale weight and the threshold weight value.

The method comprises a step of detecting humidity data, representative of a humidity of the bale. The control unit commands pressing elements of the forming chamber responsive to the humidity data, to control the density of the bale.

The method comprises a step of assessing a release of the bale from the baler, responsive to a change of the ramp position. In particular, responsive to a change of the ramp position from a raised position to a discharge position and, in succession, from the discharge position to the raised position.

The method comprises a step of detecting a presence of a plastic film around the bale in the forming chamber, through a film detection sensor. The film detection sensor acquires film detection data representative of the presence of a plastic film surrounding the bale. The film detection sensor is positioned at the top of the forming chamber.

In the step of detecting a presence of a plastic film, a camera, positioned at the top of the frame, acquires image data (being a subset of the film detection data), representative of the presence of a film on an external surface of the bale. In this step of detecting, a plurality of camera detects the image data.

BRIEF DESCRIPTION OF DRAWINGS

This and other features of the invention will become more apparent from the following detailed description of a preferred, non-limiting example embodiment of it, with reference to the accompanying drawings, in which:

FIG. 3 illustrates a part of a frame of the baler of FIG. 1;

FIG. 4 illustrates schematically a humidity sensor;

DETAILED DESCRIPTION OF PREFERRED EMBODIMENTS OF THE INVENTION

Figure 1A:
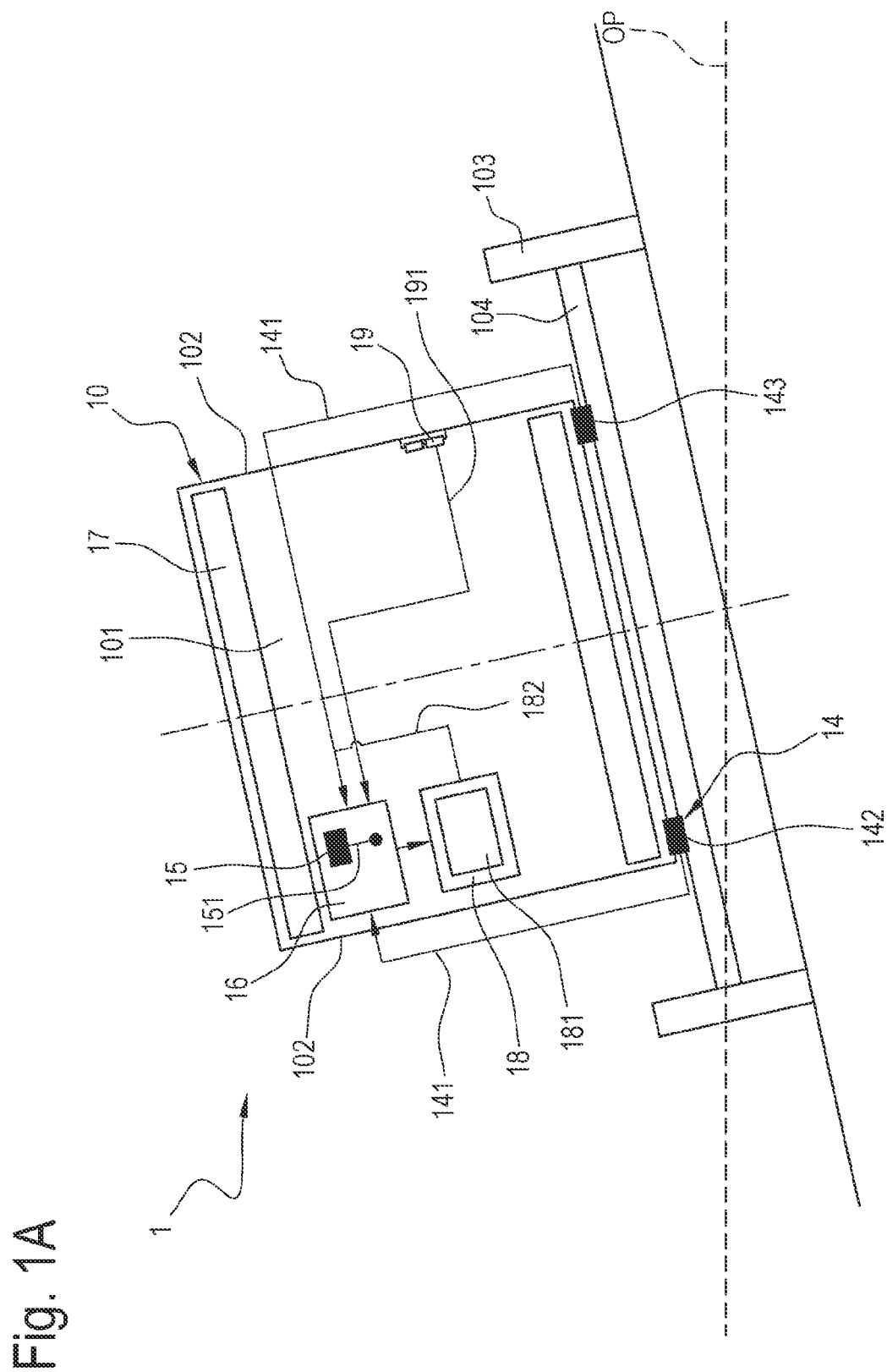
FIGS. 1A and 1B illustrate schematically a first and a second section view of a baler, respectively.
Figure 1B:
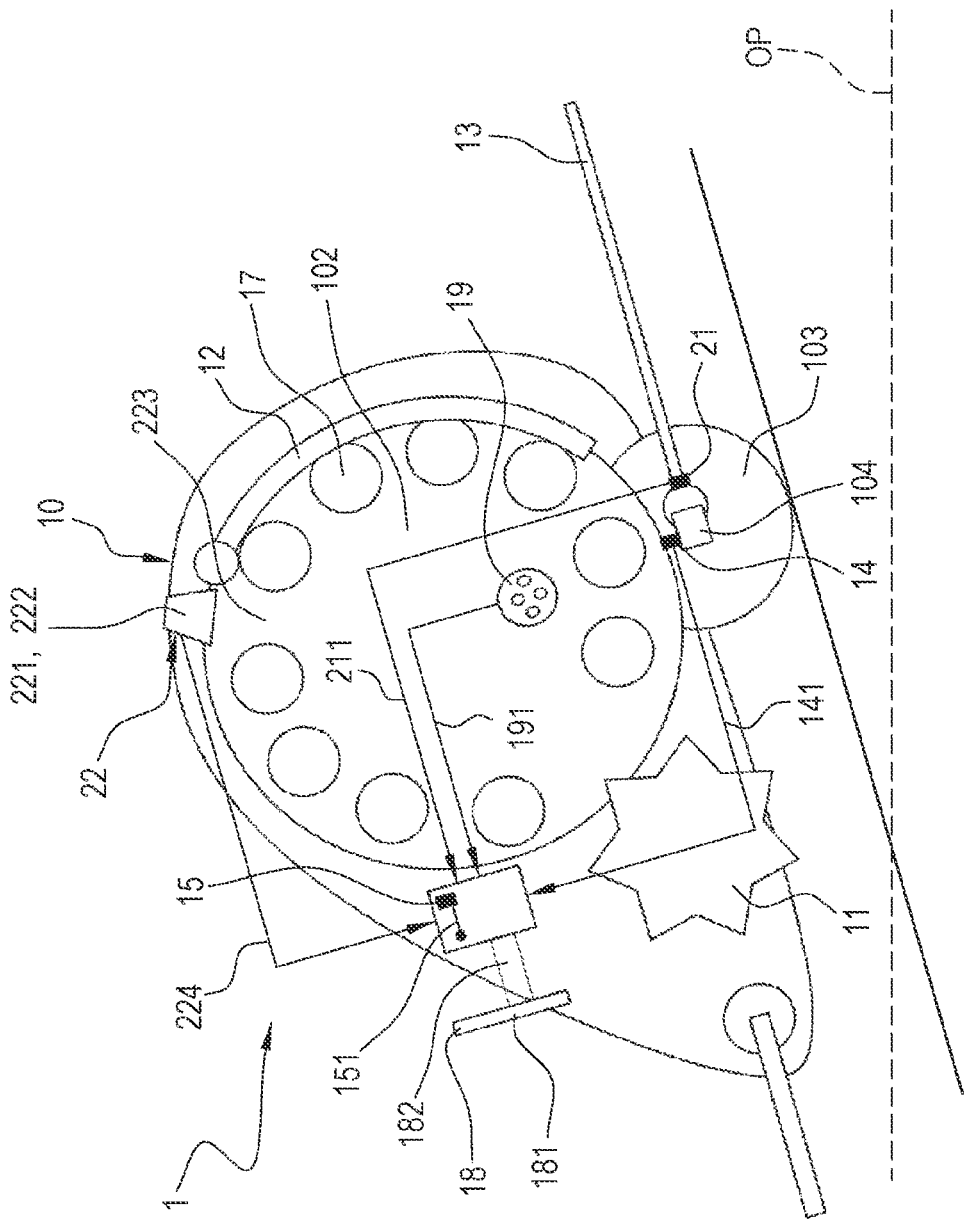
Figure 2:
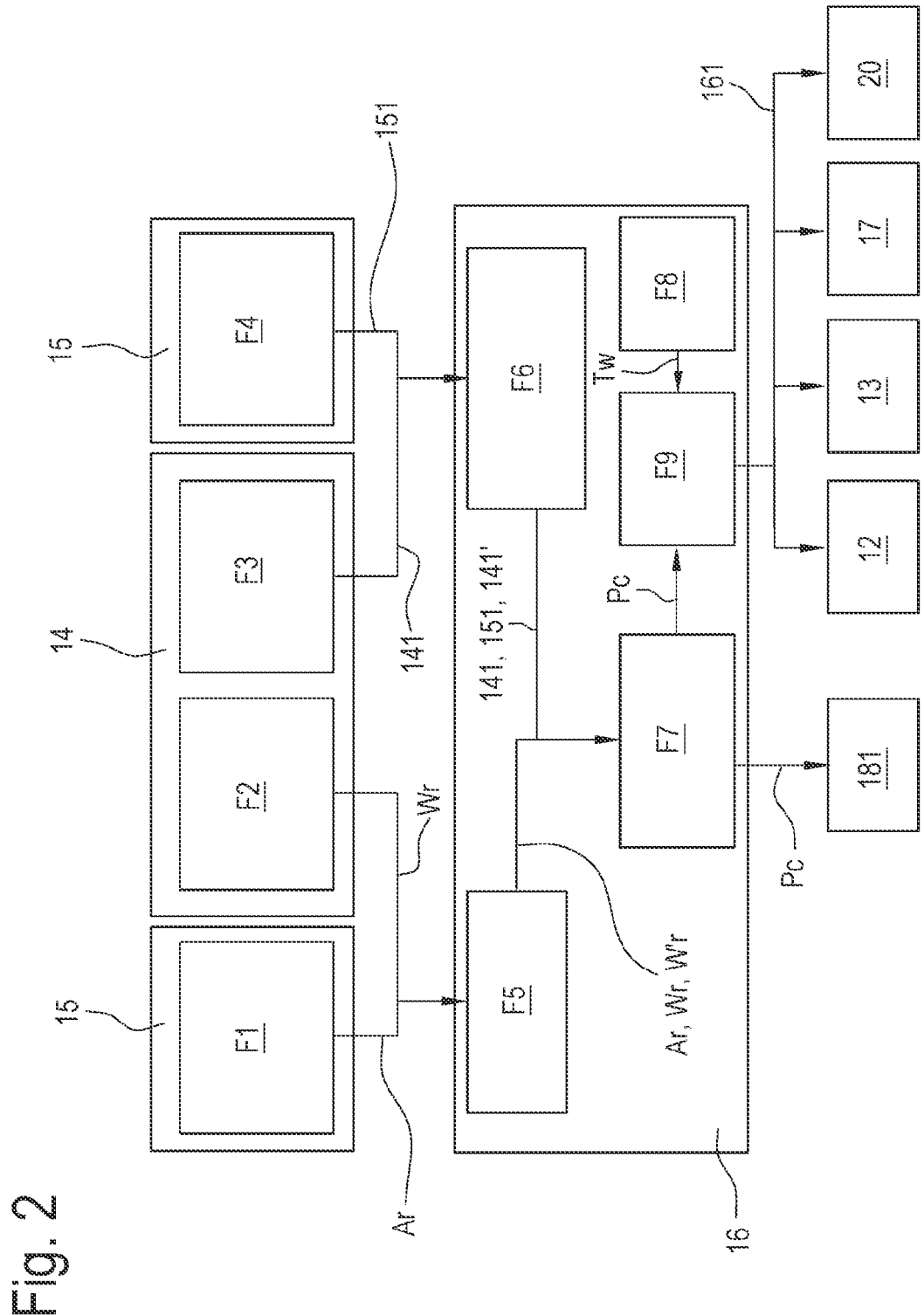
FIG. 2 illustrates a diagram of a method for detect a weight of a bale.
Figure 5A:
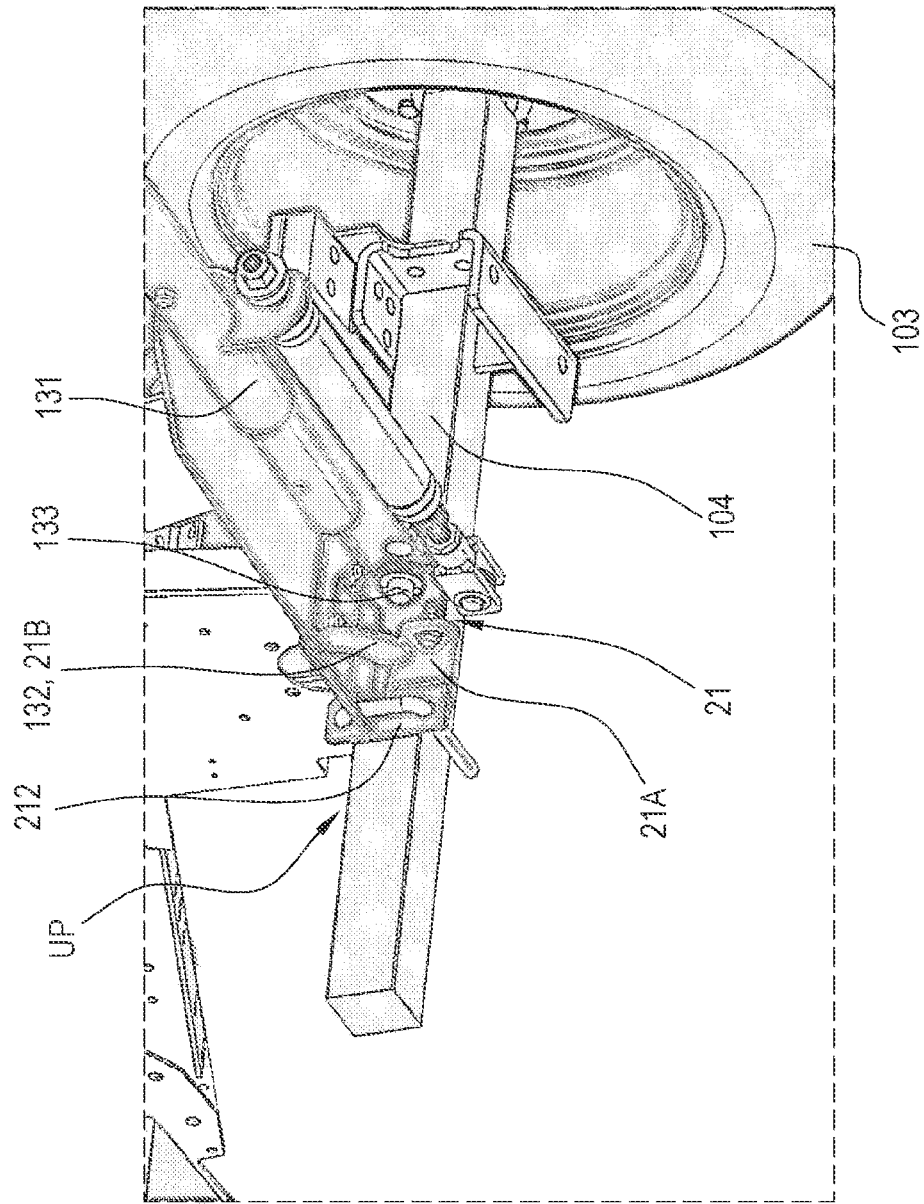
FIGS. 5A and 5B illustrate a first position and a second position of a ramp sensor of the baler of FIG. 1, respectively.
Figure 5B:
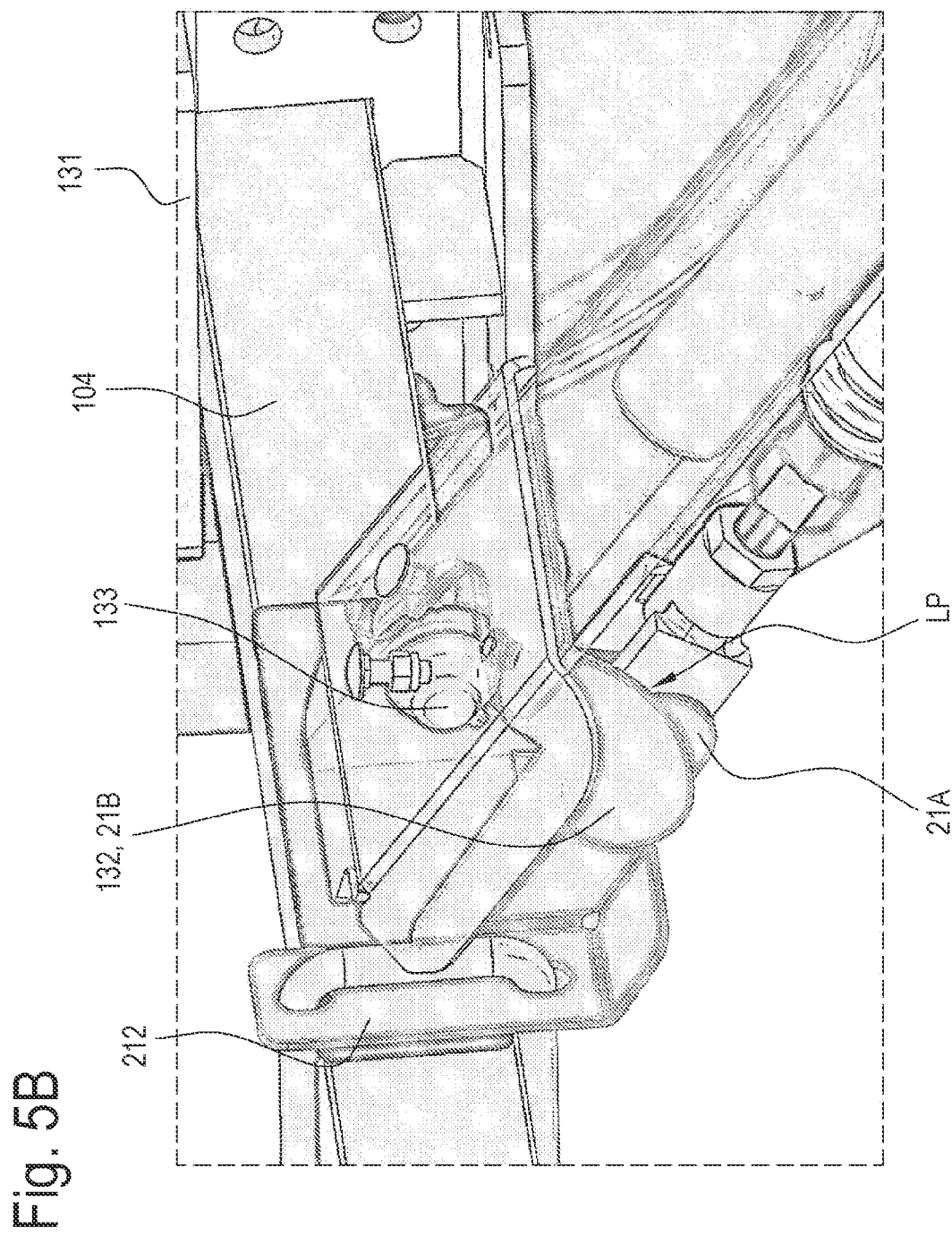

With respect to the attached drawings it has been indicated with reference 1 a baler.

The baler comprises a frame 10. The frame includes a forming chamber 101. The forming chamber 101 is configured to receive crops, compress the crops and form the bale.

The frame 10 comprises a pair of side walls 102, delimiting the forming chamber 101.

The baler 1 comprises at least a pair of wheels 103 (in some embodiments four wheels). The baler 1 comprises an axle 104.

The baler 1 comprises a feeding assembly 11. The feeding assembly 11 is configured to collect the crops form the ground. The feeding assembly 11 is configured to feed the crops into the forming chamber 101.

The baler 1 comprises a tailgate 12. The tail gate 12 is movable between a closed position, wherein the forming chamber 101 is closed, and an open position, wherein the forming chamber 101 is open to an external environment for discharging the bale.

The baler 1 comprises a ramp 13, configured to lay down the bale on the ground. The ramp 13 protrudes from the rear side of the baler 1.

The baler 1 comprises a weighing system 14. The weighing system 14 is configured to detect weight data 141, representative of a weight of the forming chamber 101. The weight system 14 comprises a first weight sensor 142. The weight system 14 comprises a second weight sensor 143.

In one embodiment, the first 142 and/or the second 143 weight sensor are positioned on the axle 104. Preferably, the first 142 and/or the second 143 weight sensor are positioned between the axle 104 and the forming chamber 101.

In one embodiment, the first 142 and the second 143 weight sensor are positioned on the axle 104, each one in proximity of a respective wheel of said pair of wheels 103.

The baler 1 comprises an inclinometer 15. The inclinometer 15 is configured to detect inclination data 151. The inclination data 151 are representative of an inclination angle of the baler 1 with respect to a horizontal plane OP.

In one embodiment, the inclinometer 15 is integrated into a printed circuit board.

The baler 1 comprises a control unit 16. The control unit 16 is connected to the weighing system 14 and/or to the inclinometer 15. The control unit 16 is configured to receive the weight data 141 and the inclination data 151. The control unit 16 is configured to calculate a corrected bale weight Pc, responsive to the weight data 141 and to the inclination data 151. In one embodiment, the printed circuit board in which the inclinometer 15 is integrated is the control unit 16, hence the inclinometer 15 is integrated into the control unit 16.

The baler 1 comprises a plurality of pressing elements 17. The plurality of pressing elements 17 is configured to press the crops into the forming chamber 101.

The weight system 14 is configured to detect tare data Wr. The tare data Wr is representative of a weight of the forming chamber 101 without crops inside it. The tare data Wr is taken under certain reference conditions. In particular, the inclinometer 15 is configured to detect a reference inclination angle Ar, that is the inclination angle of the baler 1 with respect to the horizontal plane OP when the tare data Wr is detected.

The control unit 16 is configured to store inside a memory the value of the tare data Wr and/or of the reference inclination angle Ar.

The control unit 16 is configured to receive the weight data 141 and the inclination data 151 from the weighting system 14 and form the inclinometer 15 in real time.

The control unit is configured to calculate the corrected bale weight Pc as a function of the weight data 141, of the inclination data 151, of the tare data Wr and, preferably, also of the reference inclination angle Ar.

The weight data 141 and/or the inclination data 151 may be a continuous function, showing the value of the weight of the forming chamber 101 and/or the inclination angle of the baler (with respect to the horizontal plane OP) over time.

As an example, it is disclosed a first embodiment of calculation of the corrected bale weight Pc.

According to this first embodiment, the control unit is programmed to perform the following step:
  correct the tare data Wr responsive to the reference inclination angle Ar, to derive a reference tare data Wr';
  correct, preferably in real time, the weight data 141 as a function of the inclination data 151;
  calculate the difference, preferably in real time, between the reference tare data Wr' and the corrected weight data 141', to derive the corrected bale weight Pc.

As another example, it is disclosed a second embodiment of calculation of the corrected bale weight Pc.

According to this second embodiment, the control unit is programmed to perform the following step:
  calculate, preferably in real time, the difference between the reference inclination angle Ar and the inclination data 151, to derive an angle variation;
  correct, preferably in real time, the weight data 141 as a function of the angle variation;
  calculate the difference, preferably in real time, between the tare data Wr and the corrected weight data 141', to derive the corrected bale weight Pc.

In one embodiment, the baler 1 comprises a user interface 18. The user interface 18 includes a display 181. The display 181 is connected to the control unit 16 to receive the corrected bale weight Pc. The display 181 is configured to show an indication in real time of the corrected bale weight Pc. In one embodiment, the display 181 is touch screen. The display 181 is configured to receive setting data 182.

In one embodiment, the control unit 16 is configured to store in the memory a threshold weight value Tw. The threshold weight value Tw represents a value of a maximum weight of the bale.

The control unit is configured to receive the threshold weight value Tw manually, by means of the display 181. In this case, the setting data 182 are representative of the threshold weight value Tw. In other embodiments, the control unit 16 is configured to derive the threshold weight value Tw as a function of operative parameters, for example but not only the humidity or the atmospheric pressure. In this case, the threshold weight value Tw may automatically be varied by the control unit 16.

In one embodiment, the control unit 16 is configured to control, preferably in real time, an ejection of the bale. The control unit 16 is programmed to compare the corrected bale weight Pc with the threshold weight value Tw. The control unit 16 is programmed to send command signals to the tail gate 12, responsive to the comparison between the corrected bale weight Pc and the threshold weight value Tw.

In one embodiment, the baler 1 comprises a humidity sensor 19. The humidity sensor 19 is configured to detect humidity data 191, representative of a humidity of the bale. The humidity data 191 are directly representative of the humidity of the field from which it is possible to derive the humidity of the bale or at least it is possible to derive an indication of the humidity of the bale.

The humidity sensor 19 is connected to the control unit 16. The humidity sensor 19 is configured to send, preferably in real time, the humidity data 191 to the control unit 16.

According to an embodiment, the control unit 16 is configured to elaborate the humidity data 191, to derive command signals 161 as a function of the humidity data 191. According to an embodiment, the control unit 16 is configured to elaborate the humidity data 191, to derive an optimal density of the bale. In fact, the more the humidity increase the less should be the density of the core of the bale. The control unit 16 is configured to send command signals 161 to the pressing elements, in order to keep the density of the bale around the optimal density.

The baler 1 comprise a binding system 20, configured to bind the bale with a film (a net) to avoid the disintegration of the bale. The film should be applied according to certain parameters. The control unit 16 is configured to send command signals 161 to the binding system 20, to vary the operations of the binding system responsive to the humidity.

In one embodiment, the display 181 is configured to show, preferably in real time, a value of the humidity of the bale, derived from the humidity data 191.

In one embodiment, the control unit 16 is configured to collect into the memory (eventually also into a pheripheric memory) an history of the humidity data 191, related to a specific day, a specific field or other specific features. In one embodiment, the humidity sensor is placed on one side wall 102 of said couple of side wall 102 of the frame 10.

As an example, the humidity sensor 19 comprises a first electrode 192 and a second electrode 193, each one wired to a correspondent connection wire. The first 192 and the second electrode 193 are connected by means of a resistance. When the humidity sensor is feed, the resistance is related to the humidity of the environment. The control unit 16 is configured to derive the humidity data from the resistance behaviour.

The humidity sensor 19 comprises a first couple of bolts 194, configured to allow the contact of the first electrode 192 and a second electrode 193. The humidity sensor 19 comprises a second couple of bolts 195, connected to the side wall 102 of the frame 10.

In one embodiment, the baler 1 comprises a ramp sensor 21. The ramp sensor 21 is configured to detect a presence, preferably a passage, of the bale on the ramp 13. This is very important to ensure that the bale is not on a working path of the tail gate 12 during its activation, avoiding the tail gate 12 to be blocked by the bale.

The ramp sensor 21 is connected to the control unit 16. The ramp sensor 21 is configured to send ramp data 211 to the control unit 16. The control unit is configured to generate the command signal 161 as a function of the ramp data 211. The control unit 16 is configured to send command signals 161 to the tail gate 12, to actuate it only when it is sure that the bale is not on the working path of the tail gate 12, preferably only when it is sure that the bale is no more on the ramp 13.

The ramp sensor 21 includes a static element 21A. The static element 21A is fixed to the axle 104. The ramp sensor 21 includes a moving element 21B. The moving element 21B is fixed to the ramp 13.

The ramp sensor 21 is movable between a loaded position LP, wherein the static element 21A and the moving element 21B are in a first relative position, and an unloaded position UP, wherein the static element 21A and the moving element 21B are in a second relative position.

The ramp sensor 21 is a contact sensor, configured to detect if it is touched by any objects. In other embodiment, the ramp sensor 21 can be a photocell, configured to detect the passage of objects in front of its ray. In any case, the ramp sensor 21 interacts with the ramp 13.

The ramp sensor 21 is connected to the axle 104 with a bracket 212. Hence, the ramp sensor 21 is fixed with the axle 104. The ramp 13 comprises a main frame 131 and a plate 132. The plate 132 is fixed to the main frame 131 of the ramp 13. Hence, the plate 132 is movable with respect to the axle 104 and to the ramp sensor 21.

Hence, the movable element 21B is, in this specific embodiment, defined by the plate 132, which can be considered as a part of the ramp sensor 21 that is fixed on the ramp and movable with it.

In particular, when the bale reaches the ramp 13, the weight of the bale causes a rotation of the ramp 13 around correspondent hinges 133 (around the axle 104). The plate 132 is configured to rotate together with the ramp 13. In the loaded position LP of the ramp sensor 21, the plate 132 is in contact with the ramp sensor 21 (or it intersects the ray of the photocell). In the unloaded position UP, the plate 132 is detached from the ramp sensor 21 (or it does not intersect the ray of the photo cell). The ramp sensor 21 is in loaded position LP when a load is applied to the ramp 1 (not necessarily the bale weight but even an external unknown load). The ramp sensor 21 is in unloaded position UP when no load is applied to the ramp 1.

The ramp sensor 21 is configured to send the ramp signal 211, preferably representative of the position of the plate 132.

In one specific embodiment, the ramp sensor 21 is configured to send a first value ("ON") to the control unit 16 when the ramp sensor 21 is in loaded position LP and a second value ("OFF") when the ramp sensor 21 is in the unloaded position UP. The control unit 16 is programmed to elaborate the ramp signal 211 in order to determine a trend of the ramp sensor 21 position over time. If the control unit 16 observes that the values sent by the ramp sensor 21 4 is "OFF", then "ON" and then again "OFF", it derives that the bale has passed over the ramp 13 and it has been lied on the ground. Then, when the control unit 16 has checked the passage of the bale, it is programmed to send command signal 161 to the tail gate 12 to close it.

In one embodiment, the baler 1 comprises a film detection system 22, configured to detect a presence of a film surrounding the bale.

In one embodiment, the film detection system 22 comprises a first camera 221. In one example, the film detection system 22 comprises a second camera 222.

The first 221 and the second camera 222 are positioned at the top of the frame 10. The first 221 and the second camera 222 are connected to a respective side wall 102 of said pair of side walls 102 of the frame 10. The first 221 and/or the second camera 222 are oriented towards the forming chamber 101. In particular, the first 221 and/or the second camera 222 are oriented to capture an image of the bale inside the forming chamber through an opening 223 between two adjacent pressing elements 17.

The film detection system 22 is connected to the control unit 16. The film detection system 22 is configured to send to the control unit 16 image data 224, representative of the image of the wrapped bale captured. In one embodiment, the control unit 16 is programmed to control the binding system 20 as a function of the image data 224.

The present disclosure aims also to protect an agricultural system, comprising a tractor and a baler according to any of the features disclosed in the present document. In a preferred embodiment, the tractor includes a motor to advance on the field. The baler 1 is connected to the tractor and is towed by the tractor on the field.

The present disclosure also provides a method to detect bale weight for a baler 1.

The method comprises a step of providing a frame 10, including a forming chamber 101, an axle 104, a pair of wheels 103, a feeding assembly 11, a tailgate 12, a ramp 13, a control unit 16, a plurality of pressing elements 17 and a binding system 20.

The method comprises a step of collecting the crops from the ground and a step of feeding the crops into the forming chamber 101.

The method comprises a step of moving the tail gate 12 between a closed position, wherein the forming chamber 101 is closed, and an open position, wherein the forming chamber 101 is open to an external environment for discharging the bale.

The method comprises a step of laying down the bale on the ground from the rear side of the bale, with the ramp 13.

The method comprises a step of detecting F3 weight data 141, representative of a weight of the forming chamber 101, with a weighing system 14.

In the step of detecting F3 the weight data, a first weight sensor 142 and a second weight sensor 143 detect the weight data. In the step of detecting F3 the weight data, the weight data is detected with the first weight sensor 142 and the second weight sensor 143 positioned between the axle 104 and the forming chamber 101.

The method comprises a step of detecting F4 inclination data 151, representative of an inclination angle of the baler 1 with respect to a horizontal plane OP, with an inclinometer 15.

The method comprises a step of controlling, wherein the control unit 16 control one or more of the following components: the feeding assembly 11, the tailgate 12, the ramp 13, the plurality of pressing elements 17 and the binding system 20.

In the step of controlling, the control unit 16 receives the weight data 141 and the inclination data 151. The control unit 16 calculates a corrected bale weight Pc, responsive to (as a function of) the weight data 141 and to the inclination data 151.

The method comprises a step of detecting F2 tare data, wherein the weight system 14 detects tare data Wr, representative of a weight of the forming chamber 101 without crops inside it. The method comprises a step of detecting F1 reference inclination angle, wherein the inclinometer 15 detects a reference inclination angle Ar, that is the inclination angle of the baler 1 with respect to the horizontal plane OP when the tare data Wr is detected.

The method comprises a step of storing F5, wherein the control unit 16 stores inside a memory the value of the tare data Wr and/or of the reference inclination angle Ar.

In the step of controlling, the control unit 16 receives the weight data 141 and the inclination data 151 from the weighting system 14 and form the inclinometer 15 in real time.

The method comprises a step of calculating F7, wherein the control unit calculates the corrected bale weight Pc as a function the weight data 141, of the inclination data 151, of the tare data Wr and, preferably, also of the reference inclination angle Ar.

According to a first embodiment, the step of calculating comprises the following step:
  correcting the tare data Wr responsive to the reference inclination angle Ar, to derive a reference tare data Wr';
  correcting F6, preferably in real time, the weight data 141 as a function of the inclination data 151;
  calculating F7 the difference, preferably in real time, between the reference tare data Wr' and the corrected weight data 141', to derive the corrected bale weight Pc.

As another example, it is disclosed a second embodiment of calculation of the corrected bale weight Pc.

According to a second embodiment, the step of calculating comprises the following step:
  calculating, preferably in real time, the difference between the reference inclination angle Ar and the inclination data 151, to derive an angle variation;
  correcting F6, preferably in real time, the weight data 141 as a function of the angle variation;
  calculating F7 the difference, preferably in real time, between the tare data Wr and the corrected weight data 141', to derive the corrected bale weight Pc.

The method comprises a step of showing, in a display 181, an indication in real time of the corrected bale weight Pc. In the step of showing, the display 181 receives the corrected bale weight Pc.

The method comprises a step of setting, wherein a user interface 18 receives setting data 182.

The method comprises a method of further storing F8, wherein the control unit 16 stores in the memory a threshold weight value Tw, representative of a value of a maximum weight of the bale.

In one embodiment, the control unit receives the threshold weight value Tw manually, by means of the display 181. In other embodiments, the control unit 16 derives the threshold weight value Tw as a function of operative parameters, for example but not only the humidity or the atmospheric pressure. In this case, the method includes a step automatically upgrading of threshold weight value Tw by the control unit 16.

In one embodiment, the control unit 16 controls, preferably in real time, an ejection of the bale. In this embodiment, the method comprises a step of comparing F9, wherein the control unit 16 compares the corrected bale weight Pc with the threshold weight value Tw. The control unit sends command signals to the tail gate 12, responsive to the comparison between the corrected bale weight Pc and the threshold weight value Tw.

The method comprises a step of detecting humidity data 191 representative of a humidity of the bale, with a humidity sensor 19.

The humidity sensor 19 sends, preferably in real time, the humidity data 191 to the control unit 16.

According to an embodiment, the control unit 16 elaborates the humidity data 191 and derives (generates) command signals 161 as a function of the humidity data 191. According to an embodiment, the control unit 16 elaborates the humidity data 191 and derives an optimal density of the bale. The control unit 16 sends command signals 161 to the pressing elements, in order to keep the density of the bale around the optimal density.

The method comprises a step of binding, wherein the binding system 20 binds the external surface of the bale with a film or with a net.

The control unit 16 sends command signals 161 to the binding system 20, to vary the operations of the binding system responsive to the humidity.

In one embodiment, the display 181 shows, preferably in real time, a value of the humidity of the bale, derived from the humidity data 191.

In one embodiment, the method comprises a step of collecting data, wherein the control unit 16 collects into the memory (eventually also into a peripheric memory) an history of the humidity data 191, related to a specific day, a specific field or other specific features.

The method comprises a step of fixing the humidity sensor 19 to a side wall 102 of the frame 10, for example by means of two connection bolts 195.

The method comprises a step of detecting a passage (and/or a presence) of the bale on the ramp, with a ramp sensor 21.

The ramp sensor 21 detects a presence, preferably a passage, of the bale on the ramp 13.

The ramp sensor 21 is connected to the control unit 16. The ramp sensor 21 sends ramp data 211 to the control unit 16. The control unit generates the command signal 161 as a function of the ramp data 211. The control unit 16 sends command signals 161 to the tail gate 12, to actuate it only when it is sure that the bale is not on the working path of the tail gate 12, preferably only when it is sure that the bale is no more on the ramp 13.

The step of detecting a passage (and/or a presence) of the bale on the ramp includes a step of moving the ramp sensor 21 between a loaded position LP, wherein a static element 21A and a moving element 21B of the ramp sensor 21 are in a first relative position, and a unloaded position UP, wherein the static element 21A and the moving element 21B are in a second relative position.

In one embodiment, the ramp sensor 21 detects if it is touched by any objects or detects the passage of objects in front of its ray.

In one embodiment, the ramp sensor 21 (the ramp 13) includes a plate 132 (that defines the movable element 21B of the ramp sensor 21) fixed to a main frame 131 of the ramp 13. In the step of detecting, during the passage of the bale on the ramp 13, the plate moves with respect to the axle 104 and to the static element 21A of the ramp sensor 21.

Hence, the movable element 21B is, in this specific embodiment, defined by the plate 132, which can be considered as a part of the ramp sensor 21 that is fixed on the ramp and movable with it.

In particular, when the bale reaches the ramp 13, the weight of the bale causes a rotation of the ramp 13 around correspondent hinges 133 (around the axle 104). The plate 132 rotates together with the ramp 13.

The ramp sensor 21 sends the ramp signal 211, preferably representative of the position of the plate 132.

In one specific embodiment, the ramp sensor 21 sends a first value ("ON") to the control unit 16 when the ramp sensor 21 is in loaded position LP and a second value ("OFF") when the ramp sensor 21 is in the unloaded position UP. The control unit 16 elaborates the ramp signal 211 in order to determine a trend of the ramp sensor 21 position over time. If the control unit 16 observes that the values sent by the ramp sensor 21 is "OFF", then "ON" and then again "OFF", it derives that the bale has passed over the ramp 13 and it has been lied on the ground. Then, when the control unit 16 has checked the passage of the bale, it sends command signal 161 to the tail gate 12 to close it.

The method comprises a step of detecting a film on the bale, wherein a film detection system 22 detects a presence of a film surrounding the bale.

The film detection system 22 sends to the control unit 16 image data 224, representative of the image of the wrapped bale captured. In one embodiment, the control unit 16 controls the binding system 20 as a function of the image data 224.

The following paragraphs, listed with alphanumeric reference, represent not limitative examples to describe the present disclosure.

A00. A baler, comprising:
a frame, including a forming chamber, configured to receive crops and to form a bale;
a feeding assembly, configured to collect the crops form the ground and to feed the crops into the forming chamber;
a tailgate, movable between a closed position, wherein the forming chamber is closed, and an open position, wherein the forming chamber is open to an external environment for discharging the bale;
a ramp, configured to lay down the bale on the ground;
a weighing system, configured to detect weight data representative of a weight of the forming chamber;
a inclinometer, configured to detect inclination data, representative of an inclination angle of the baler with respect to a horizontal plane;
a control unit, connected to the weighing system and to the inclinometer, to receive the weight data and the inclination data, and configured to calculate a corrected bale weight responsive to the weight data and to the inclination data, characterized by the fact that the control unit is configured to store reference tare data in a memory, the reference tare data being representative of a weight of the empty forming chamber, and is programmed to calculate the corrected bale weight in real time, as a function of the stored reference tare data, of the weight data and of the inclination data, wherein the control unit receives the weight data and the inclination data in real time.

A01. The baler according to paragraph A00, comprising a user interface, including a display, configured to show an indication in real time of the corrected bale weight.

A02. The baler according to paragraph A01, wherein the control unit is configured to store in the memory a threshold weight value and to control in real time an ejection of the bale, responsive to a comparison between the corrected bale weight and the threshold weight value.

A03. The baler according to any of the paragraphs from A00 to A002, wherein the control unit is configured to:
store a reference inclination angle in the memory, representative of the inclination angle of the baler associated to the reference tare data;
correct the weight data as a function of the inclination data and the reference inclination angle;
calculate the corrected bale weight as a difference, in real time, between the corrected weight data and the reference tare data.

A03. The baler according to any of the paragraphs from A00 to A003, wherein the control unit includes a printed circuit board and wherein the inclinometer is integrated into the printed circuit board.

The invention claimed is:

1. A baler, comprising:
a frame, including a forming chamber, configured to receive crops and to form a bale;
a feeding assembly, configured to collect the crops form the ground and to feed the crops into the forming chamber;
a tailgate, movable between a closed position, wherein the forming chamber is closed, and an open position, wherein the forming chamber is open to an external environment for discharging the bale;
a control unit;
a ramp, configured to lay down the bale on the ground and movable between a raised position and a discharge position, for allowing a release of the bale;
a ramp sensor, configured to send a ramp signal to the control unit in response to a change of position of the ramp from the raised position to the discharge position and vice versa,
wherein the control unit is connected to the ramp sensor for assessing a release of the bale, responsive to a change of the ramp position from the raised position to the discharge position and, in succession, from the discharge position to the raised position,
and wherein the baler comprises a timer and wherein the control unit is connected to the timer to detect a time interval responsive to the ramp signal and is programmed to control the tailgate as a function of the ramp signal and of the detected time interval.

2. The baler according to claim 1, wherein the control unit includes a memory containing a predetermined value for the time interval, and wherein the control unit is programmed to detect the time interval starting from the change of the ramp position from the discharge position to the raised position subsequent to the change of the ramp position from the raised position to the discharge position, and wherein the control unit is programmed to inhibit a closure of the tail gate until the time interval is lower than the predetermined value.

3. The baler according to claim 1, comprising an axle, connected to the frame, and wherein the ramp sensor includes a static element, fixed to the axle, and a moving element, fixed to the ramp, and wherein the ramp sensor is movable between a loaded position, wherein the static element and the moving element are in a first relative position, and a unloaded position, wherein the static element and the moving element are in a second relative position.

4. The baler according to claim 1, comprising a humidity sensor, configured to detect humidity data, representative of a humidity of the bale.

5. The baler according to claim 4, wherein the humidity sensor is configured to detect the humidity data in real time and to send the humidity data to the control unit.

6. The baler according to claim 4, comprising pressing elements, positioned into the forming chamber and configured to compress the bale into the forming chamber, wherein the control unit is configured to command the pressing elements responsive to the humidity data, to control a density of the bale.

7. The baler according to claim 4, wherein the frame comprises a couple of side wall, delimiting the forming chamber, and wherein the humidity sensor is placed on one side wall of said couple of side wall.

8. The baler according to claim 1, comprising:
a weighing system, configured to detect weight data representative of a weight of the forming chamber and connected to the control unit to receive the weight data;

a inclinometer, configured to detect inclination data, representative of an inclination angle of the baler with respect to a horizontal plane, and connected to the control unit to receive the inclination data,
wherein the control unit is configured to calculate a corrected bale weight responsive to the weight data and to the inclination data, and wherein the control unit is configured to store reference tare data in a memory, the reference tare data being representative of a weight of the empty forming chamber, and is programmed to calculate the corrected bale weight in real time, as a function of the stored reference tare data, of the weight data and of the inclination data, wherein the control unit receives the weight data and the inclination data in real time.

9. The baler according to claim 8, comprising a user interface, including a display, configured to show an indication in real time of the corrected bale weight.

10. The baler according to claim 9, wherein the control unit is configured to store in the memory a threshold weight value and to control in real time an ejection of the bale, responsive to a comparison between the corrected bale weight and the threshold weight value.

11. The baler according to claim 8, wherein the control unit is configured to:
store a reference inclination angle in the memory, representative of the inclination angle of the baler associated to the reference tare data;
correct the weight data as a function of the inclination data and the reference inclination angle;
calculate the corrected bale weight as a difference, in real time, between the corrected weight data and the reference tare data.

12. The baler according to claim 8, wherein the control unit includes a printed circuit board and wherein the inclinometer is integrated into the printed circuit board.

13. The baler according to claim 1, comprising a film detection sensor, configured to acquire film detection data, representative of the presence of a plastic film surrounding the bale.

14. The baler according to claim 13, wherein the film detection sensor is positioned at the top of the forming chamber and includes either or both of:
a camera, connected to the control unit;
a transducer, sensible to a physical quantity that varies responsive to the presence of the plastic film around the bale.

15. The baler according to claim 13, wherein the baler is configured to be towed by a tractor, or is self-propelled.

16. A method for providing bales through a baler, the baler comprising a frame with a forming chamber, a feeding assembly, a tail gate and a ramp, the method comprising the following steps:
feeding crops into the forming chamber through the feeding assembly, so that a bale is formed into the forming chamber;
moving the tail gate between a closed position, wherein the forming chamber is closed, and an open position, wherein the forming chamber is open to an external environment for discharging the bale;
laying down the bale through the ramp;
detecting a ramp signal, representative of a change of position of the ramp from the raised position to the discharge position and vice versa, through a ramp sensor;
sending the ramp signal to a control unit;
assessing a release of the bale, responsive to a change of the ramp position from the raised position to the discharge position and, in succession, from the discharge position to the raised position;
detecting a time interval responsive to the ramp signal, through a timer;
controlling the tailgate as a function of the ramp signal and of the detected time interval.

17. The method according to claim 16, comprising the following steps:
detecting weight data representative of a weight of the forming chamber, through a weighing system;
detecting inclination data, representative of an inclination angle of the baler with respect to a horizontal plane, through an inclinometer;
receiving the the weight data and the inclination data into the control unit of the baler;
calculating a corrected bale weight, responsive to the weight data and to the inclination data, through the control unit;
storing reference tare data in a memory, the reference tare data being representative of a weight of the empty forming chamber, and wherein the control unit receives the weight data and the inclination data in real time and calculates the corrected bale weight in real time, as a function of the stored reference tare data, of the weight data and of the inclination data.

18. Method according to claim 16, comprising a step of detecting humidity data, representative of a humidity of the bale, and wherein the control unit commands pressing elements of the forming chamber responsive to the humidity data and to the corrected bale weight, to control a density of the bale.

19. Method according to claim 16, comprising a step of detecting a presence of a plastic film around the bale in the forming chamber, through a film detection sensor, configured to acquire film detection data representative of the presence of a plastic film surrounding the bale, the film detection sensor being positioned at the top of the forming chamber.

20. A round baler, comprising:
a frame, including a forming chamber, configured to receive crops and to form a bale;
a feeding assembly, configured to collect the crops form the ground and to feed the crops into the forming chamber;
a tailgate, movable between a closed position, wherein the forming chamber is closed, and an open position, wherein the forming chamber is open to an external environment for discharging the bale;
a control unit;
a ramp, configured to lay down the bale on the ground and movable between a raised position and a discharge position, for allowing a release of the bale;
a ramp sensor, configured to send a ramp signal to the control unit in response to a change of position of the ramp from the raised position to the discharge position or vice versa,
wherein the control unit is connected to the ramp sensor for assessing a release of the bale, responsive to a change of the ramp position from the raised position to the discharge position and, in succession, from the discharge position to the raised position,
and wherein control unit is programmed to derive a time interval responsive to the ramp signal and is programmed to control the tailgate as a function of the ramp signal and of the time interval.

\* \* \* \* \*